United States Patent
Silverman

(10) Patent No.: US 6,307,862 B1
(45) Date of Patent: Oct. 23, 2001

(54) METHOD AND APPARATUS FOR MONITORING AND CONTROLLING A LOCAL AREA NETWORK

(75) Inventor: David Phillip Silverman, Somerville, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/046,047

(22) Filed: Mar. 23, 1998

(51) Int. Cl.[7] .................................................. H04B 7/212
(52) U.S. Cl. .......................... 370/442; 370/345; 370/445
(58) Field of Search ................................. 370/442, 443, 370/445, 344, 347, 338, 336, 241, 245, 537, 538, 539, 540, 541, 458, 559, 462, 465, 345, 487, 498; 455/3.1, 5.1

(56) References Cited

U.S. PATENT DOCUMENTS

| | | | |
|---|---|---|---|
| 5,361,091 | * 11/1994 | Hoarty et al. ............................. | 348/7 |
| 5,485,630 | * 1/1996 | Lee et al. ............................... | 455/4.1 |
| 5,642,155 | * 6/1997 | Cheng .................................... | 348/12 |
| 5,878,277 | * 3/1999 | Ohta ..................................... | 395/857 |
| 5,883,677 | * 3/1999 | Hofmann .............................. | 348/584 |
| 5,949,775 | * 9/1999 | Rautiola et al. ....................... | 370/338 |
| 5,983,068 | * 11/1999 | Tomich et al. ........................ | 455/3.1 |
| 5,987,524 | * 11/1999 | Yoshida et al. ....................... | 709/245 |
| 6,069,899 | * 5/2000 | Foley ................................... | 370/494 |

* cited by examiner

Primary Examiner—Alpus H. Hsu
Assistant Examiner—Brian Nguyen

(57) ABSTRACT

A method and an apparatus for establishing a local area network (LAN) using a channel stripper, a LAN controller and a cable television cable that couples peripheral devices to the LAN controller. The channel stripper removes signals from one or more selected channels from a cable television signal path. The channels form a signal path between the LAN controller and peripheral devices connected to the LAN. The remaining channels provide a digital cable television signal. Both the LAN channels and the digital cable television channels are combined onto a common coaxial cable. The cable stripper may be a multiplexer/demultiplexer or a notch filter. Alternately, the channel stripper can assign frequency channels outside the frequency bandwidth of to the LAN and maintain the cable television signals as received. The LAN controller can create additional communications channels by using Time Division Multiple Access protocols to assign time slots to each of the peripheral devices that are coupled to the LAN.

14 Claims, 6 Drawing Sheets

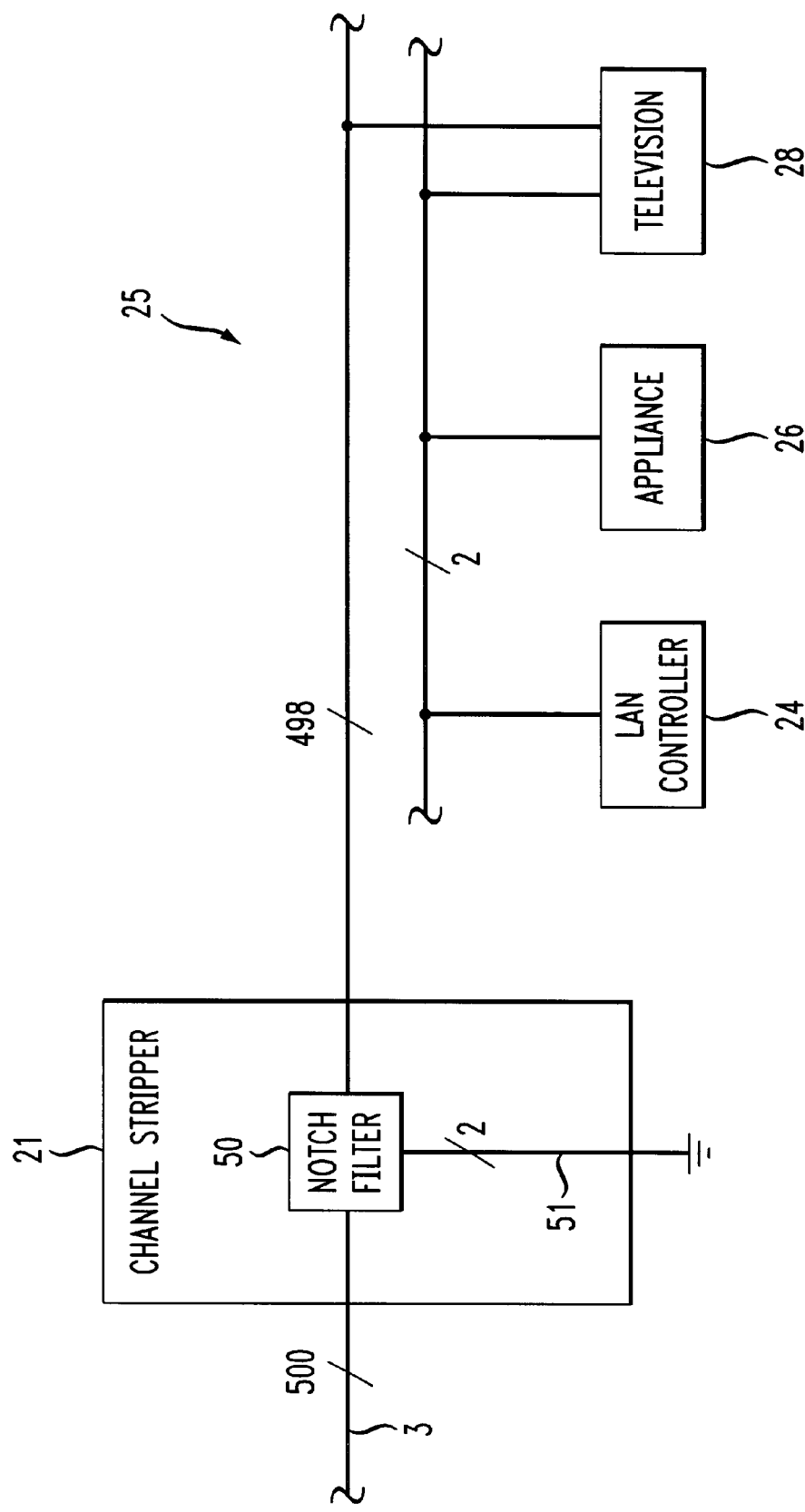

METHOD AND APPARATUS FOR MONITORING AND CONTROLLING A LOCAL AREA NETWORK

This Application is related to U.S. Pat. No. 6,163,270, issued Dec. 19, 2000, entitled "Apparatus and Method for Controlling Communication in an Electronic Control and Monitoring System" which is hereby incorporated by reference.

BACKGROUND OF THE INVENTION

1. Field of Invention

This invention relates to a local area network. In particular, the invention relates to a local area network that uses an existing cable to provide communications and data flow between a controller and peripheral devices coupled thereto.

2. Description of Related Art

Most conventional electronic control and monitoring systems (e.g., a home security system) are either wireless or hard-wired. Wireless systems rely on ultrasonic or radio frequency signals to provide control, monitoring and alarm functions. Hard-wired systems typically use dedicated wiring and components coupled to a system controller to provide system control, monitoring, alarm and display functions.

Both wireless and hard-wired systems have drawbacks. Wireless systems are more prone to false alarms. Hard-wired systems are more difficult (and hence expensive) to install. Further, most wireless and hard-wired controllers have only limited programming and display capabilities. Thus, new technology is needed to enhance electronic control and monitoring systems.

SUMMARY OF THE INVENTION

The present invention provides a monitoring and control local area network (LAN). The LAN may use any new or existing cable television (CATV) coaxial cable to transmit to and receive data from devices coupled to an electronic control and monitoring system. The LAN may be in a home, an office building or other dwelling such as a mobile structure and an unoccupied structure, for example. Thus, the LAN provides two-way communication between the devices using the normally uni-directional CATV coaxial cable.

In a preferred embodiment, signals from selected cable television channels are removed from a cable television signal and the selected channels then are used to carry LAN signals and become LAN channels. The remaining CATV channels and the LAN channels are combined to form a new CATV signal, which is transmitted on a standard CATV cable.

In a preferred embodiment, a demultiplexer installed at a demarcation point of the CATV cable of a home demultiplexes the CATV channels to remove, or strip, the selected channels from the remaining CATV channels. The selected channels are regenerated by devices on the LAN carrying the LAN signals and the regenerated selected channels are multiplexed with the remaining CATV channels to form the new CATV signal, which is transmitted over the CATV cable that is wired in the home. In the above embodiment, two channels are stripped from the CATV signal. A LAN controller uses the two channels for two-way communication with peripheral devices attached to the LAN.

BRIEF DESCRIPTION OF THE DRAWINGS

The invention is described in detail with reference to the following drawings, wherein like numerals refer to like elements, and wherein;

FIG. 8 is a block diagram of an alternate channel stripper.

DETAILED DESCRIPTION OF PREFERRED EMBODIMENTS

Figure 1:
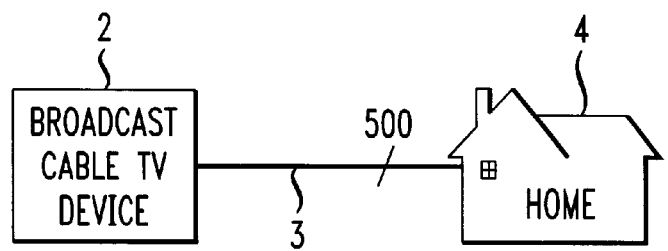
FIG. 1 shows a cable television environment.

FIG. 1 shows a cable television environment 1 including a broadcast cable television (CATV) device 2, which sends digital CATV signals over a CATV cable 3 to a home 4. The CATV cable 3 may carry as many as 500 or more channels of digital televisions signals, with the channels multiplexed into a single signal and carried on a coaxial cable. A channel may be a frequency channel of a Frequency Division Multiple Access (FDMA) protocol or a time slot of a Time Division Multiple Access (TDMA) protocol, for example. The broadcast CATV device 2 includes the necessary headend components, amplifiers and cable taps necessary to send the CATV signal to the home 4.

Figure 2:
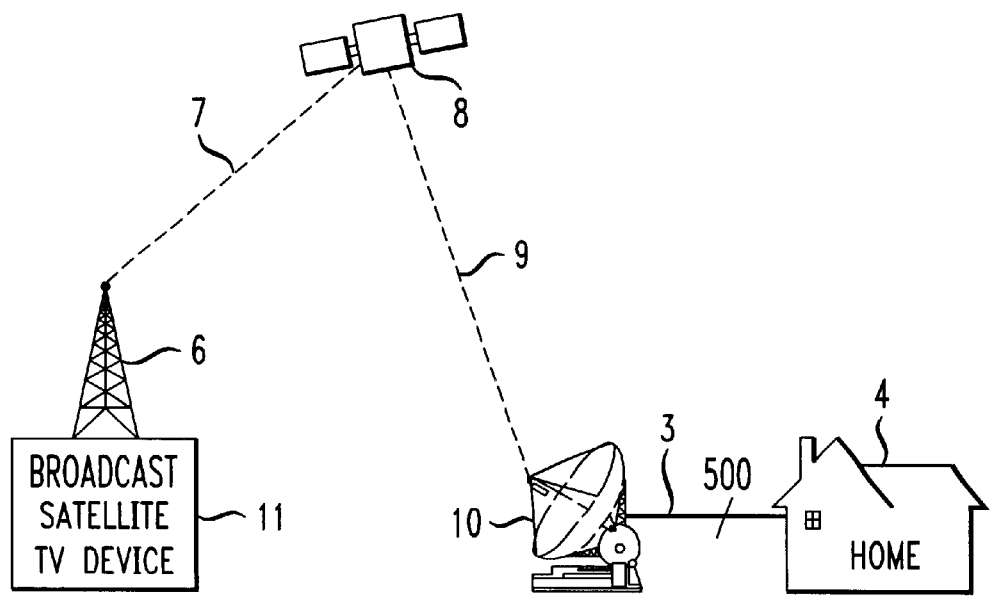
FIG. 2 shows an alternate cable television environment.

FIG. 2 shows an alternate cable television environment 5. In FIG. 2, a broadcast satellite CATV device 11 includes the necessary headend equipment to process the digital CATV signal. However, the CATV signal is relayed via an antenna 6 and an uplink path 7 to a satellite 8. The satellite 8 sends the CATV signal via a downlink path 9 to the home 4, where it is received by an antenna 10. The CATV signal is then sent via the coaxial CATV cable 3 to the home 4.

Figure 3:
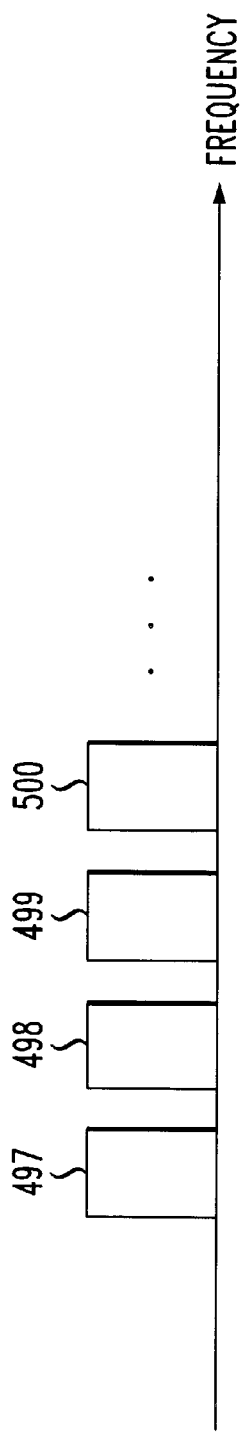
FIG. 3 shows a Frequency Division Multiple Access signal.

The CATV environments 1 and 5 described above, which may transmit digital CATV signals, may employ an FDMA protocol to assign frequency bands to specific channels. FIG. 3 is a representative diagram of frequency channels in a FDMA protocol. Under FDMA protocols, the CATV signal is divided into frequency channels such as frequency channels 497, 498, 499 and 500. Each of these frequency channels may be allocated to a specific use. For example, the channels 497 and 498 may be allocated to active (i.e., actually carrying a broadcast signal) CATV channels and the channels 499 and 500 to inactive CATV channels. In current CATV environments, about 200 channels of the 500 or more channels are in active use with the remaining channels in reserve for future expansion.

Figure 4:
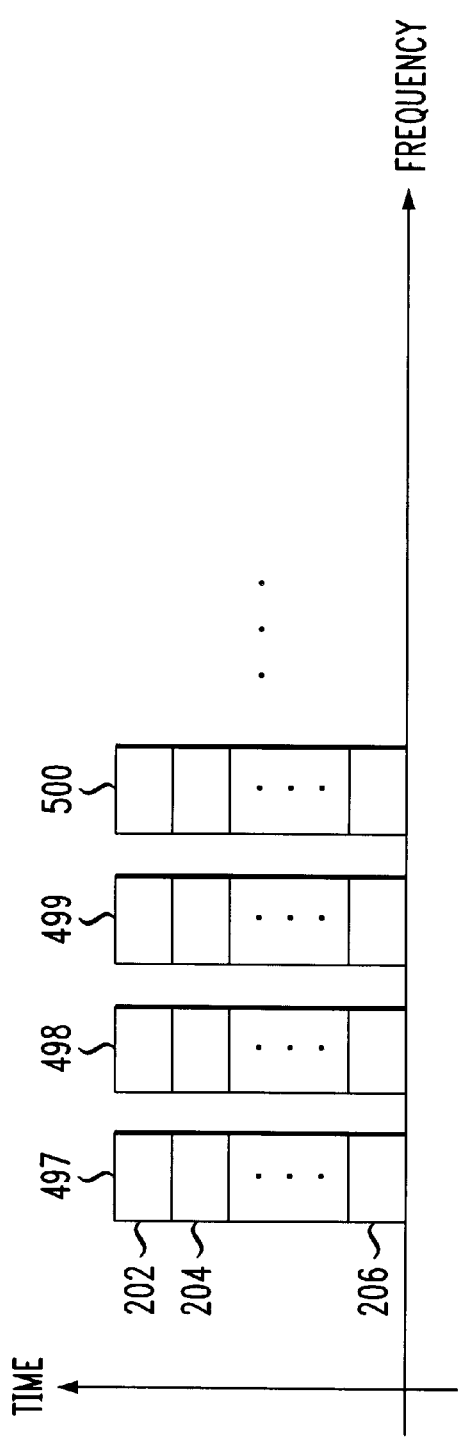
FIG. 4 shows a Time Division Multiple Access signal.

The FDMA protocol may be enhanced by time slicing the channels using wellknown techniques such as Time Division Multiple Access (TDMA). In TDMA, individual FDMA frequency channels may be further subdivided in time. That is, additional frequency channels may be obtained by dividing the frequency channels 497–500, for example, using TDMA protocols. Thus, as shown in FIG. 4, a plurality of time slots such as the time slots 202, 204 and 206 may be defined for the frequency channel 497.

Figure 5:
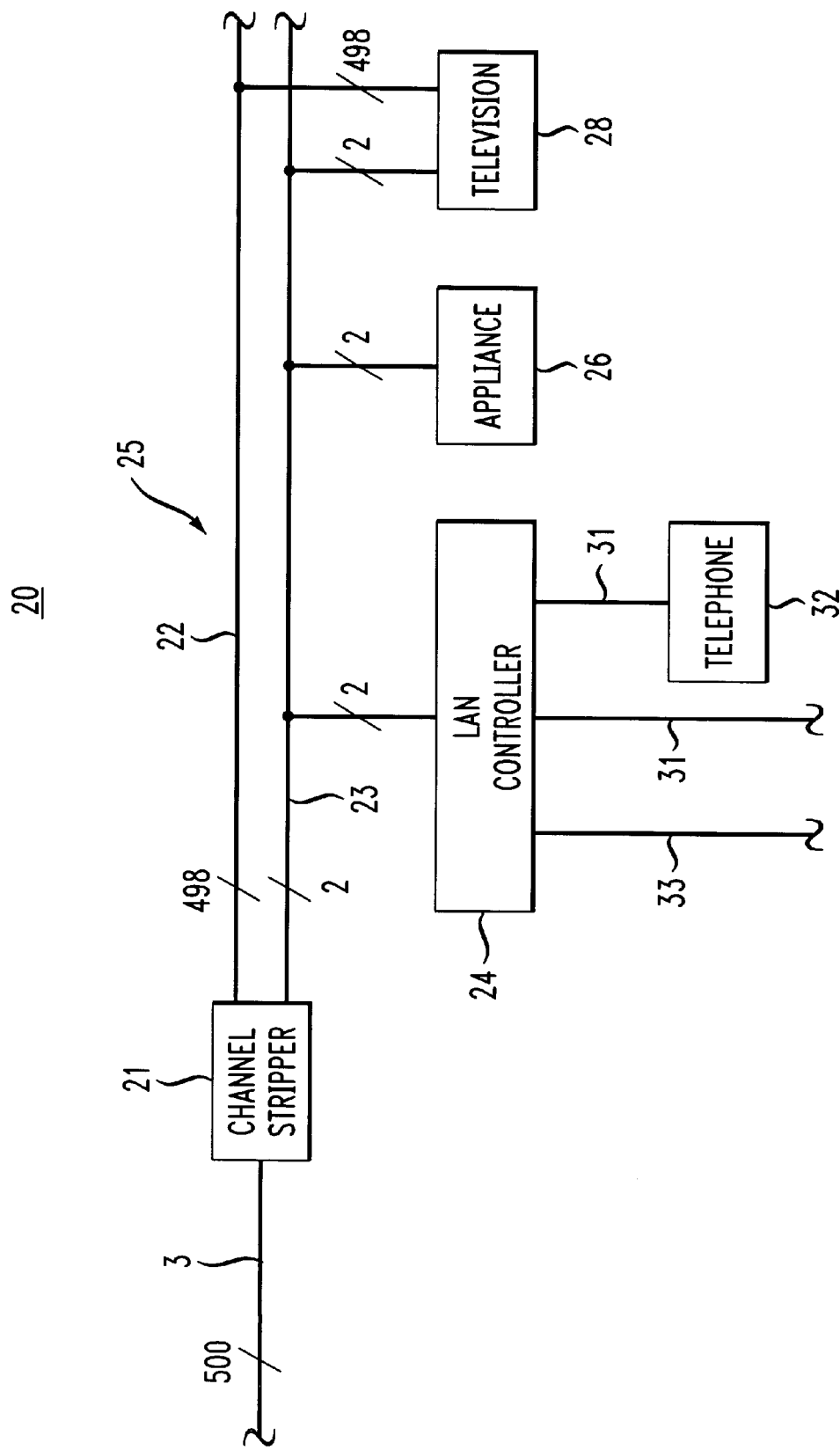
FIG. 5 is a block diagram of a home LAN.

FIG. 5 shows an exemplary home local area network (LAN) 20 for monitoring and controlling electronic devices in the home 4. In FIG. 5, the CATV cable 3, carrying 500 CATV channels, for example, terminates at a channel stripper 21. The channel stripper 21 strips out a selected number of CATV channels, thereby making the stripped channels available for use with the home LAN 20. In this embodiment, the channel stripper 21 strips out two CATV channels (e.g., channels 499 and 500). The channel stripper 21 will be described in more detail later. The channel stripper 21 generates an output signal on a CATV coaxial cable 25, which has 498 CATV channels and channels 499 and 500 without CATV signals, which may be used as LAN channels. The coaxial cable 25 is shown having two signal paths 22 and 23. The signal path 22 carries the first 498 CATV channels and the signal path 23 carries the LAN channels (the two CATV channels 499 and 500). Thus, the single coaxial cable 25 carries all 500 channels that were carried over the CATV cable 3.

The coaxial cable 25 is coupled to a LAN controller 24 and other devices, such as an appliance 26 and a television 28, through standard coaxial cable taps. The appliance 26 may be any electronic component that can be adapted to communicate with the LAN controller 24 through the LAN channels. Examples of the appliance 26 may be a garage door opener, a computer, a home appliance such as a coffee maker, and an overhead light. While FIG. 5 shows only one appliance 26, many appliances may be connected to the coaxial cable 25. As shown in FIG. 5, the LAN controller communicates with the appliance 26 and the television 28 using the LAN channels in the signal path 23. The television 28 also connects to the signal path 22 to receive the 498 channels of digital CATV signals. Thus, the home LAN 20 provides two-way communication using the coaxial cable 25 that is normally used for unidirectional communication, as described below.

The LAN controller 24 may be connected to a telephone 32 via a telephone line 31 using the standard daisy chain configuration, for example. The telephone line 31 connects to a standard telephone network (not shown), such as a public switched telephone network (PSTN). The LAN controller 24 also may connect to the PSTN over a dedicated telephone line 33. Thus, the LAN controller 24 can communicate with any device capable of using the PSTN as well as independently communicating through the telephone network. For example, the LAN controller 24 can initiate a page to a pager or communicate with a cellular telephone and communicate with a wireless telephone while monitoring the telephone 32, for example.

In operation, one of the two LAN channels (499 and 500 on path 23) is an upstream channel and the other LAN channel is a downstream channel. The LAN controller 24 receives signals from devices connected to the LAN 20 such as the appliance 26 and the television 28 over the upstream channel and outputs signals to the other devices over the downstream channel. Further details concerning the operation of the LAN controller 24 are contained in U.S. Pat. No. 6,163,270, issued Dec. 19, 2000, entitled "Apparatus and Method for Controlling Communication in an Electronic Control and Monitoring System."

In the upstream channel, when more than one appliance 26 transmits data at the same time, an interference or "collision" occurs. Accordingly, a protocol is provided to eliminate signal interference such as Carrier-Sense Multiple Access with Collision Detection (CSMA/CD) protocol used in ethernets, for example. In CSMA/CD, each appliance 26 "listens" to the upstream channel when transmitting data. When the data on the upstream channel is not identical to the data transmitted, a collision has occurred and the appliance 26 "backs-off" the upstream channel for a random amount of time and then tries again. A data transmission is completed only when no collisions occur.

Other, more elaborate protocols may also be used in the LAN 20, including TDMA and Code Division Multiple Access (CDMA) protocols, for example. As discussed earlier, additional channels may be obtained by dividing the upstream channel in time using a TDMA protocol. Thus, as was shown in FIG. 4, a plurality of time slots such as the time slots 202, 204 and 206 may be defined for the frequency channel 500. When TDMA and FDMA protocols are used together, a channel allocated to a particular appliance is a particular time slot of a particular frequency such as the time slot 202 of the frequency channel 500.

Figure 6:
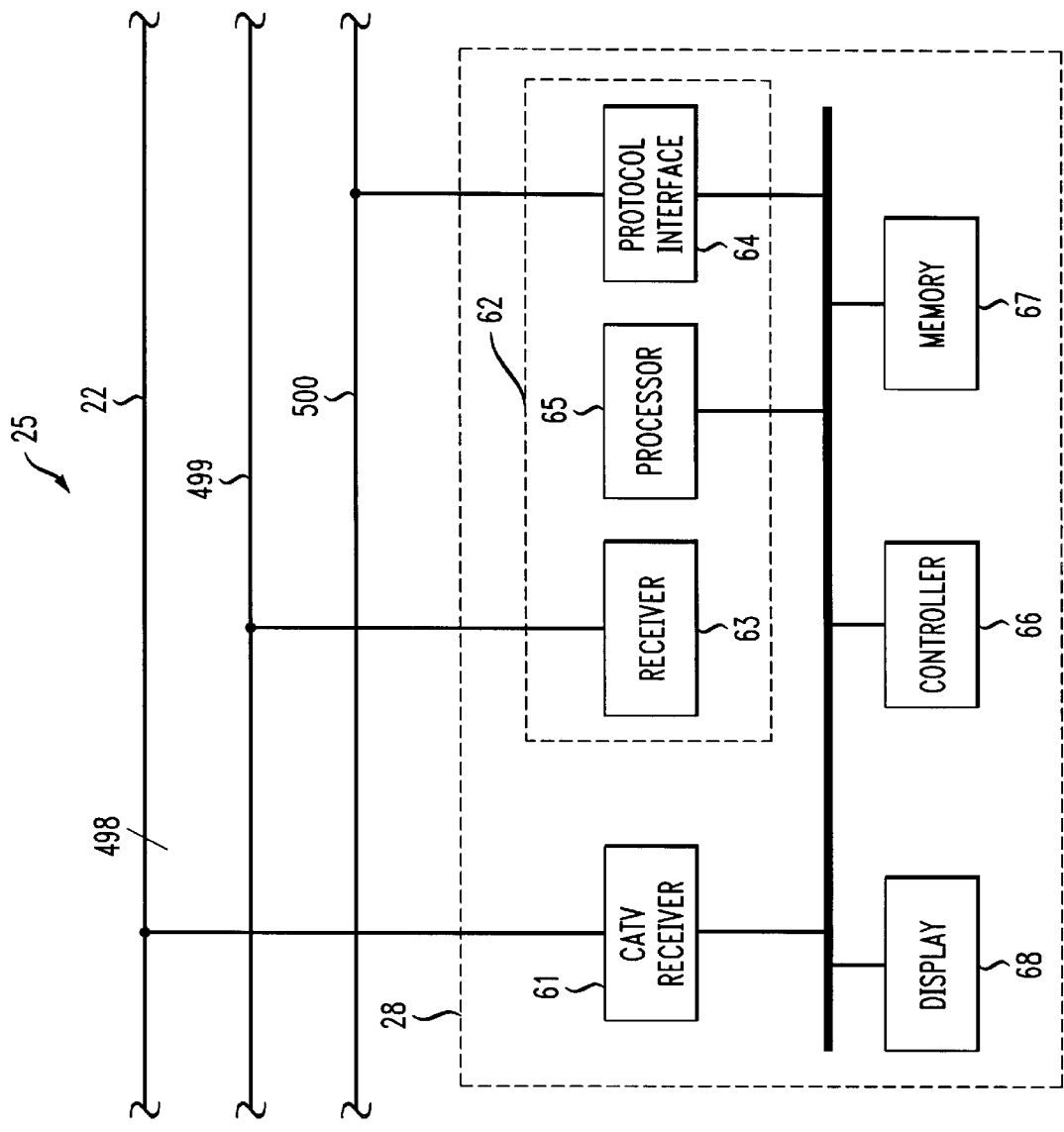
FIG. 6 is a block diagram of a television adapted for use with the home LAN.

FIG. 6 shows the television 28, adapted to communicate with the LAN controller 24 over the coaxial cable 25, using protocols, such as the CSMAICD. A CATV receiver 61 receives CATV channels 1–498 over the signal path 22. A memory 67 stores data used to operate the television 28. A LAN interface 62 includes a receiver 63, a protocol interface 64 and a processor 65. The receiver 63 receives signals sent by the LAN controller 24 over the downstream channel and passes the signals to the processor 65. The processor 65 interprets the data contained in the signal and sends signals to a controller 66. The controller 66 may, for example, formulate a text message for display on a display 68 of the television 28, based on the data in the signal. The processor 65 also formulates signals, based on data received from monitoring the controller 66, regarding the status of the television 28, and sends the signals to the protocol interface 64. The protocol interface 64, which implements CSMA/CD for example, sends signals to the LAN controller 24 over the upstream channel. While FIG. 6 shows the processor 65 and the controller 66, both of these components may be combined into a common controller.

Figure 7:
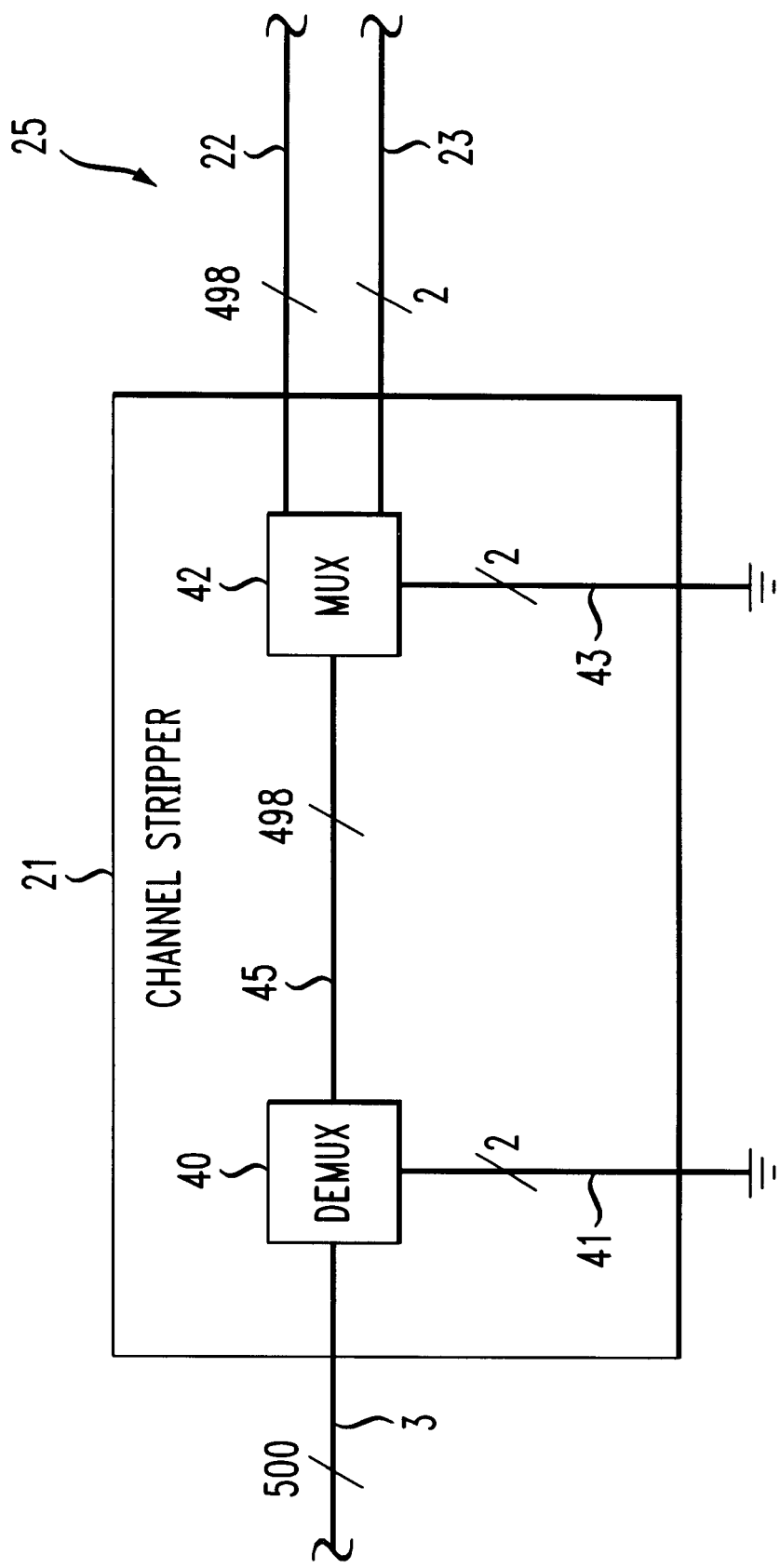
FIG. 7 is a block diagram of an exemplary channel stripper.

As noted above, the LAN channels can use existing channels of a CATV signal. FIG. 7 shows an exemplary embodiment of the channel stripper 21. The CATV cable 3, carrying 500 or more CATV channels for a digital television broadcast terminates at a demultiplexer 40 in the channel stripper 21. The CATV cable 3 carries the 500 channels using the FDMA protocol, for example. The demultiplexer 40 demultiplexes the 500 FDMA channels and removes the CATV signals in channels 499 and 500, shown in FIG. 7 as ground path 41. The remaining 498 channels are sent to a multiplexer 42 over a signal path 45. The multiplexer 42 combines the 498 channels with the new channels 499 and 500 that have no signals (e.g., ground path 43) to form a new CATV signal. The new CATV signal is output onto the coaxial cable 25, thus supplying the signal paths 22 and 23 over the single coaxial cable 25.

In the above description of the channel stripper 21, two channels were stripped out from the 500 incoming channels. However, the LAN 20 is not limited to the use of two channels. One channel could be used with the LAN 20, with the LAN controller 24 applying an appropriate protocol such as TDMA. Alternately, two channels could be stripped out for each device coupled to the LAN 20. In this alternative, signal interference is eliminated because each device has two dedicated channels for sending information to and receiving information from the LAN controller 24, respectively.

In yet another embodiment, the LAN 20 can use channels that are outside the frequency band of the CATV signals. In this example, the channel stripper 21 does not strip out any of the 500 or more CATV channels. Using out-of-band signals eliminates the need for the complex hardware associated with the channel stripping operation and preserves the 500 CATV channels for use with the television 28.

FIG. 8 shows another embodiment of the channel stripper 21. A notch filter 50 receives the 500 channels input from the CATV cable 3 using the FDMA protocol, for example. The notch filter 50, using well-known techniques, removes signals from two channels, for example, as shown by signal path 51, and passes the signals of the remaining 498 channels to the coaxial cable 25. Peripheral devices such as the appliance 26 and the television 28 connect to the coaxial cable 25 and communicate with the LAN controller 24 using the two LAN channels, for example.

Because the channel stripper 21 is located at a demarcation point of the home 4 (i.e., the point at which the CATV system ends and the home 4 begins), any data contained in the downstream components (e.g., the LAN controller 24 and the television 28), is effectively blocked from entering the CATV cable 3 that supplies the cable television signals. Therefore, problems (i.e., viruses) existing in the LAN 20 cannot be transmitted to the CATV device 2, for example. The home LAN 20 also allows two-way communication between devices in a traditionally uni-directional environment.

In the embodiments described above, both FDMA and TDMA protocols were used to establish communications channels for the LAN 20. However, other protocols may be used with the LAN 20. These protocols include CDMA and Wavelength Division Multiple Access protocols.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for establishing a local area network (LAN) using at least one cable television (CATV) channel, comprising:
   generating LAN signals in at least one LAN channel that conforms to a selected CATV channel;
   transmitting the LAN signals from a LAN controller through the selected CATV channel over a CATV cable, wherein non-LAN signals are transmitted to a television on non-selected CATV channels through the CATV cable;
   receiving the LAN signals at at least one of a plurality of devices, wherein the LAN signals control or monitor the at least one of a plurality of devices;
   receiving a CATV signal at a channel stripper;
   removing signals of the selected CATV channel from the CATV signal;
   multiplexing LAN signals with the non-LAN signals of the non-selected CATV channels to form a new CATV signal; and
   transmitting the new CATV signal in the CATV cable to one of the plurality of devices.

2. The method of claim 1, wherein the selected channel comprises two channels of the CATV signal.

3. The method of claim 1, wherein the CATV signal uses Frequency Division Multiple Access protocols.

4. The method of claim 1, wherein at least one selected channel is further processed to provide Time Division Multiple Access (TDMA) channels, each of the TDMA channels being assigned to correspond to one of the plurality of devices coupled to the new CATV signal.

5. The method of claim 4, further comprising coupling the LAN controller to a telephone network, the telephone network providing a communication path between the LAN controller and at least one telephone coupled to the telephone network.

6. The method of claim 5, wherein the at least one telephone is one of a wired telephone, a wireless telephone and a cellular telephone.

7. The method of claim 5, wherein the LAN controller communicates with a pager using the telephone network by sending a page to the pager.

8. The method of claim 4, wherein the plurality of devices includes at least one of a television, a computer, a garage door opener and a home appliance.

9. The method of claim 1, wherein Frequency Division Multiple Access (FDMA) protocol is used for the CATV signal and the removing step comprises notch filtering the CATV signal to remove at least one frequency channel from the CATV signal.

10. The method of claim 1, wherein the removing step comprises assigning at least one frequency channel out-of-band with respect to the CATV signal, the out-of-band channel forming the LAN channel.

11. The method of claim 1, wherein the LAN channel transmits signals to the at least one of a plurality of devices using a Carrier-Sense Multiple Access with Collision Detection protocol.

12. A local area network (LAN), comprising:
   a cable television (CATV) cable;
   at least one device;
   a LAN controller coupled to the device through the CATV cable; and
   a channel stripper, wherein the channel stripper receives a CATV signal, removes the selected CATV channel from the CATV signal, multiplexes the LAN channel with the non-selected CATV channels to form a new CATV signal, and transmits the new CATV signal in the CATV cable to the device and the television,
   wherein:
      the LAN controller and the device communicate through the CATV cable by generating LAN signals in at least one LAN channel that conforms to a selected CATV channel,
      the LAN controller and the device transmit and receive LAN signals through the selected CATV channel through the CATV cable,
      non-LAN signals are transmitted to a television over non-selected CATV channels through the CATV cable, and
      the LAN signals control or monitor the device.

13. The LAN of claim 12, wherein the channel stripper notch filters the CATV signal to remove signals of the selected channel from the CATV signal.

14. The LAN of claim 12, wherein the LAN controller provides Time Division Multiple Access (TDMA) protocol for the LAN channel, each TDMA channel provided by the LAN controller being assigned to one of a plurality of devices coupled to the new CATV signal.

* * * * *

UNITED STATES PATENT AND TRADEMARK OFFICE
CERTIFICATE OF CORRECTION

PATENT NO. : 6,307,862 B1  
DATED : October 23, 2001  
INVENTOR(S) : David Phillip Silverman Page 1 of 1

It is certified that error appears in the above-identified patent and that said Letters Patent is hereby corrected as shown below:

<u>Title page,</u>  
ABSTRACT, line 14, delete "of to" and insert therefor -- to --.

<u>Column 5,</u>  
Line 45, delete "at at" and insert therefor -- at --.

Signed and Sealed this

Twenty-first Day of May, 2002

Attest:

Attesting Officer

JAMES E. ROGAN  
*Director of the United States Patent and Trademark Office*